(12) United States Patent
Fukuman et al.

(10) Patent No.: US 10,175,355 B2
(45) Date of Patent: Jan. 8, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Aichi-Pref. (JP); TOYOTA JIDOSHA KABUSHIKI KAISHA, Toyota-Shi, Aichi-Ken (JP)

(*) Notice: Subject to any disclaimer, the term of this patent is extended or adjusted under 35 U.S.C. 154(b) by 560 days.

(21) Appl. No.: 14/887,625

(22) Filed: Oct. 20, 2015

(65) Prior Publication Data

US 2016/0116583 A1    Apr. 28, 2016

(30) Foreign Application Priority Data

Oct. 22, 2014 (JP) .................................. 2014-215090

(51) Int. Cl.
*G01S 15/46* (2006.01)
*G01S 7/527* (2006.01)
(Continued)

(52) U.S. Cl.
CPC ............ *G01S 15/931* (2013.01); *G01S 7/527* (2013.01); *G01S 15/46* (2013.01); *G01S 15/878* (2013.01);
(Continued)

(58) Field of Classification Search
CPC ................. G01S 13/931; G01S 5/0273; G01S 2013/462; G01S 15/931; G01S 15/46; G01S 15/878; G01S 2015/465; G01S 2015/938

See application file for complete search history.

(56) References Cited

U.S. PATENT DOCUMENTS 3,418,325 A   12/1968   Nigel
5,122,990 A    6/1992   Deines
(Continued)

FOREIGN PATENT DOCUMENTS

CN   103605125   2/2014
JP   S63127179   5/1988
(Continued)

OTHER PUBLICATIONS

U.S. Appl. No. 14/880,526 and its entire file history, filed Oct. 12, 2015, Fukuman, et al.
(Continued)

*Primary Examiner* — Peter M Bythrow
(74) *Attorney, Agent, or Firm* — Knobbe, Martens, Olson & Bear, LLP

(57) ABSTRACT

An object detection apparatus for detecting an object around a moving object carrying the apparatus by transmitting a probe wave and receiving reflections of the probe wave from the object via a plurality of ranging sensors attached to the moving object. In the apparatus, a position determiner determines whether or not a position of the object calculated by a position calculator based on the reflections received by a pair of adjacent ranging sensors, from one of which is the probe wave is transmitted, is out of an overlapping range of ranges of object detection for the respective adjacent ranging sensors. A position invalidator is configured to, based on the determination made by the position determiner, determine (Continued)

that the object position calculated by the position calculator is invalid.

8 Claims, 6 Drawing Sheets

(51) Int. Cl.
*G01S 15/87* (2006.01)
*G01S 15/93* (2006.01)

(52) U.S. Cl.
CPC ... *G01S 2015/465* (2013.01); *G01S 2015/938* (2013.01)

(56) References Cited

U.S. PATENT DOCUMENTS

| | | | |
|---|---|---|---|
| 5,315,562 A | 5/1994 | Bradley | |
| 5,689,250 A | 11/1997 | Kremser | |
| 5,761,155 A * | 6/1998 | Eccardt | G01B 17/00 367/87 |
| 5,923,282 A | 7/1999 | Honma et al. | |
| 5,940,011 A * | 8/1999 | Agravante | G01S 7/032 180/167 |
| 6,289,282 B1 * | 9/2001 | Hassler | B60Q 9/006 342/455 |
| 6,434,486 B1 | 8/2002 | Studt | |
| 6,898,528 B2 | 5/2005 | Zorka | |
| 7,068,155 B2 * | 6/2006 | Kade | B60T 7/22 340/435 |
| 7,202,776 B2 | 4/2007 | Breed | |
| 7,873,181 B1 | 1/2011 | Maluf | |
| 8,108,147 B1 | 1/2012 | Blackburn | |
| 8,452,506 B2 | 5/2013 | Groult | |
| 8,605,947 B2 | 12/2013 | Zhang et al. | |
| 8,989,944 B1 | 3/2015 | Agarwal et al. | |
| 9,221,396 B1 * | 12/2015 | Zhu | B60Q 9/008 |
| 9,507,023 B2 | 11/2016 | Nakano | |
| 9,541,644 B2 * | 1/2017 | Hoenes | G01S 15/003 |
| 2002/0047780 A1 * | 4/2002 | Nishimoto | G01S 7/52004 340/540 |
| 2003/0195704 A1 | 10/2003 | Sekiguchi | |
| 2004/0238249 A1 * | 12/2004 | Kim | B60K 31/0008 180/169 |
| 2005/0046606 A1 | 3/2005 | Yoneda | |
| 2005/0195071 A1 * | 9/2005 | Ewerhart | B60Q 9/006 340/435 |
| 2006/0031015 A1 | 2/2006 | Paradie | |
| 2006/0085177 A1 | 4/2006 | Toyama et al. | |
| 2006/0119473 A1 | 6/2006 | Gunderson et al. | |
| 2007/0176822 A1 | 8/2007 | Shirakawa | |
| 2008/0068146 A1 | 3/2008 | Cauldwell | |
| 2008/0204208 A1 | 8/2008 | Kawamata et al. | |
| 2009/0299662 A1 | 12/2009 | Fehrenbach | |
| 2010/0214872 A1 * | 8/2010 | Schmid | G01S 7/527 367/98 |
| 2011/0044507 A1 * | 2/2011 | Strauss | B60R 21/0134 382/103 |
| 2011/0133917 A1 | 6/2011 | Zeng | |
| 2011/0241857 A1 * | 10/2011 | Brandenburger | G01S 15/87 340/435 |
| 2012/0307594 A1 | 12/2012 | Enoue et al. | |
| 2014/0340993 A1 | 11/2014 | Honda | |
| 2015/0097704 A1 * | 4/2015 | Kwon | B60Q 9/006 340/932.2 |
| 2015/0310281 A1 | 10/2015 | Zhu et al. | |
| 2016/0253575 A1 | 9/2016 | Kakegawa et al. | |
| 2017/0261602 A1 * | 9/2017 | Olshansky | G01S 7/411 |

FOREIGN PATENT DOCUMENTS

| | | |
|---|---|---|
| JP | H06-138225 | 5/1994 |
| JP | H06-150195 | 5/1994 |
| JP | 2005-070943 | 3/2005 |
| JP | 2008-039497 | 2/2008 |
| JP | 2008-122137 | 5/2008 |
| JP | 2013-124982 | 6/2013 |
| JP | 2014-089077 A | 5/2014 |
| JP | 2014-093039 | 5/2014 |
| JP | 2015-004562 | 1/2015 |
| KR | 2013-0119674 | 11/2013 |
| WO | WO 2005/091015 | 9/2005 |

OTHER PUBLICATIONS

U.S. Appl. No. 14/918,330 and its entire file history, filed Oct. 20, 2015, Fukuman, et al.
U.S. Appl. No. 14/887,623 and its entire file history, filed Oct. 20, 2015, Fukuman, et al.
U.S. Appl. No. 14/918,319 and its entire file history, filed Oct. 20, 2015, Fukuman, et al.
U.S. Appl. No. 14/918,373 and its entire file history, filed Oct. 20, 2015, Fukuman, et al.
U.S. Appl. No. 14/918,920 and its entire file history, filed Oct. 21, 2015, Fukuman, et al.
U.S. Appl. No. 14/919,498 and its entire file history, filed Oct. 21, 2015, Fukuman, et al.
U.S. Appl. No. 14/919,562 and its entire file history, filed Oct. 21, 2015, Fukuman, et al.
U.S. Appl. No. 14/880,526, 2016/0116585, Apr. 28, 2016, Fukuman et al.
U.S. Appl. No. 14/918,330, 2016/0116591, Apr. 28, 2016, Fukuman et al.
U.S. Appl. No. 14/887,623, 2016/0116441, Apr. 28, 2016, Fukuman et al.
U.S. Appl. No. 14/918,319, 2016/0116590, Apr. 28, 2016, Fukuman et al.
U.S. Appl. No. 14/918,373, 2016/0116586, Apr. 28, 2016, Fukuman et al.
U.S. Appl. No. 14/918,920, 2016/0117841, Apr. 28, 2016, Fukuman et al.
U.S. Appl. No. 14/919,498, U.S. Pat. No. 9,575,179, Feb. 21, 2017, Fukuman et al.
U.S. Appl. No. 14/919,562, 2016/0116588, Apr. 28, 2016, Fukuman et al.
United States Patent and Trademark Office, Advisory Action, U.S. Appl. No. 14/880,526, dated May 25, 2018, in 4 pages.
United States Patent and Trademark Office, Final Office Action, U.S. Appl. No. 14/918,319, dated Jul. 19, 2018 in 12 pages.
United States Patent and Trademark Office, Notice of Allowance, U.S. Appl. No. 14/918,920, dated Apr. 11, 2018 in 7 pages.
United States Patent and Trademark Office, Office Action, U.S. Appl. No. 14/887,623, dated Aug. 30, 2017 in 21 pages.
United States Patent and Trademark Office, Final Office Action, U.S. Appl. No. 14/887,623, dated May 7, 2018 in 38 pages.
Chinese document, "The Basic Characteristics of a Multiple Echo", in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.
Installation and Operation of Ship Navigation System, Beijing Institute of Technology Press, dated Aug. 2014 in 8 pages.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.

(56) References Cited

OTHER PUBLICATIONS

United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/918,920, dated Feb. 23, 2017 in 13 pages.
United States Patent and Trademark Office, Office Action, U.S. Appl. No. 14/918,920, dated Dec. 15, 2017 in 13 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
Tian Fenxia, "Pipeline Obstacle Detecting and Locating Based on Ultrasonic Waves", Southwest Jiaotong Postraduate Dissertation, Jun. 2013, TP391, p. 30.
Notice of Allowance and Fee(s) Due, U.S. Appl. No. 14/919,562, dated Aug. 1, 2018, in 11 pages.
Notice of Allowance and Fee(s) Due, U.S. Appl. No. 14/918,920, dated Jun. 11, 2018, in 11 pages.

* cited by examiner

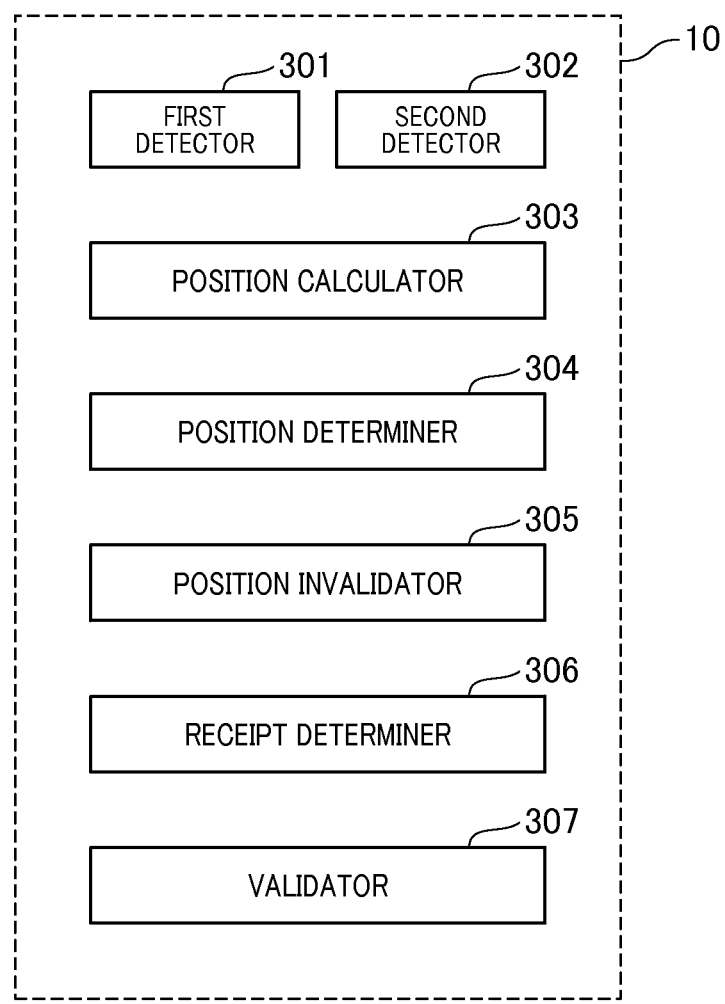

OBJECT DETECTION APPARATUS

CROSS-REFERENCE TO RELATED APPLICATION

This application is based on and claims the benefit of priority from earlier Japanese Patent Applications No. 2014-215090 filed Oct. 22, 2014, the descriptions of which are incorporated herein by reference.

BACKGROUND

Technical Field

The present invention relates to an object detection apparatus for detecting an object around a vehicle carrying the apparatus.

Related Art

Conventionally, a known object detection apparatus, as disclosed in Japanese Patent Application Laid-Open Publication No. 2014-89077, includes at least one ranging sensor, such as an ultrasonic sensor or the like, mounted in a vehicle to detect an object, such as a pedestrian, an obstacle or the like, around the vehicle, and based on detection results, performs various types of control, such as actuation of a braking device and notification to a driver, for improving vehicle driving safety.

The object detection apparatus disclosed in Japanese Patent Application Laid-Open Publication No. 2014-89077 includes a plurality of (for example, two) ranging sensors mounted in the vehicle to calculate a widthwise position of the object based on the principle of triangulation, where the widthwise position of the object refers to a position of the object in a widthwise or cross vehicle direction perpendicular to a traveling direction of the vehicle. If the widthwise position of the object is within the vehicle width, it is determined that the object has been detected. If the widthwise position of the object is not within the vehicle width, it is determined that the object has not been detected. Performing such a determination process can prevent erroneously detecting an object at a position where the object is actually less likely to interact with or contact the vehicle as an object that is likely to interact with the vehicle.

In the object detection apparatus disclosed in Japanese Patent Application Laid-Open Publication No. 2014-89077, a probe wave is transmitted from one of the two ranging sensors and then reflected waves are received at the two ranging sensors. The widthwise position of the object is calculated based on reflection wave information including a distance between each ranging sensor and the object and a distance between the two ranging sensors. However, the reflection of the ultrasound wave may vary with various factors, such as object shapes, the number of objects present in an environment around the vehicle, and environments about the vehicle. Therefore, an object may be erroneously detected in a location where no object actually exists.

In consideration of the foregoing, exemplary embodiments of the present invention are directed to providing an object detection apparatus capable of preventing erroneous detection of an object using ranging sensors.

SUMMARY

In accordance with an exemplary embodiment of the present invention, there is provided an object detection apparatus for detecting an object around a moving object having a plurality of ranging sensors attached to the moving object by transmitting a probe wave and receiving reflections of the probe wave from the object via the plurality of ranging sensors. In the apparatus, a first detector is configured to detect the object based on a direct wave that is a reflection of the probe wave from the object, where the probe wave and the reflection are respectively transmitted and received by a first ranging sensor that is one of the plurality of ranging sensors. A second detector is configured to detect the object based on an indirect wave that is a reflection of the probe wave from the object, where the reflection is received by a second ranging sensor that is another one of the plurality of ranging sensors. A position calculator is configured to calculate an object position as a position of the object based on the detections of the first and second detectors according to the principle of triangulation. A position determiner is configured to determine whether or not the object position calculated by the position calculator is out of an overlapping range of a range of direct object detection and a range of indirect object detection, where the range of direct object detection is an area where the first ranging sensor can detect the object using the direct wave and the range of indirect object detection is an area where the second ranging sensor can detect the object via the indirect wave. An position invalidator is configured to, based on the determination made by the position determiner, determine that the object position calculated by the position calculator is invalid.

A position of the object that can be detected by two triangulation-enabled ranging sensors is within an overlapping area of a first range of object detection for one of the two ranging sensors and a second range of object detection for the other of the two ranging sensors. Therefore, a correct object position calculated based on the principle of triangulation should fall within the overlapping area. Conversely, if the object position calculated based on the principle of triangulation is out of the overlapping area, it is likely that the calculated object position (also referred to as a detected position) is incorrect.

Addressing this concern, in the above embodiment, based on a positional relationship between the object position calculated based on the principle of triangulation and the overlapping area of the first and second ranges of object detection, it is determined that the object position calculated based on the principle of triangulation is invalid. With this configuration, discarding the calculation result which provides the detected object position having suspicious validity can prevent erroneous object detections.

BRIEF DESCRIPTION OF THE DRAWINGS

FIG. 6B is a functional block diagram of an electronic control unit of the object detection system in accordance with the third embodiment.

DESCRIPTION OF SPECIFIC EMBODIMENTS

Figure 1:
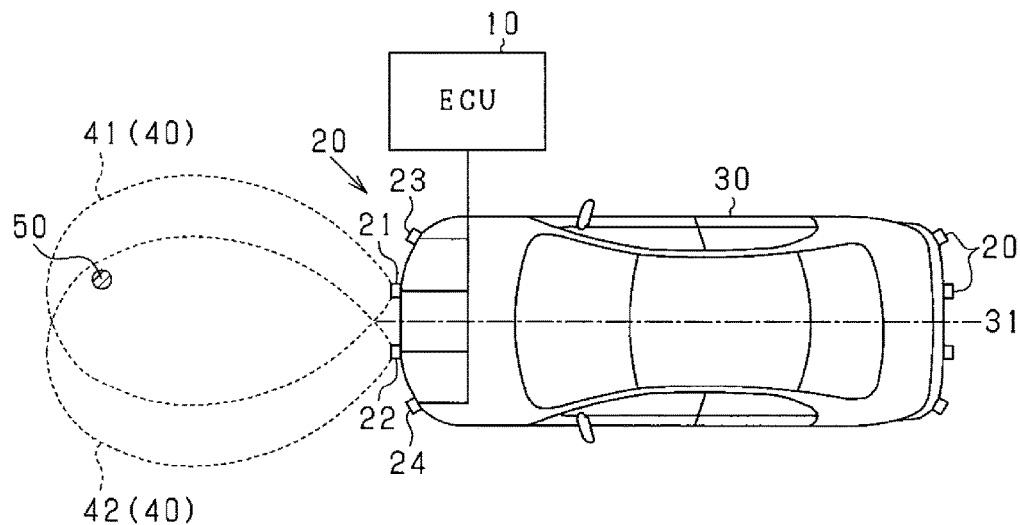
FIG. 1 is a schematic of an object detection system in accordance with a first embodiment of the present invention.

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals.

First Embodiment

An object detection apparatus mounted in a moving object in accordance with a first embodiment will now be explained with reference to the accompanying drawings. The object detection apparatus of the present embodiment is mounted in a vehicle as the moving object and is configured to receive object sensing information from ranging sensors mounted in the vehicle to detect an object around the vehicle, such as another vehicle, a roadway construction or the like. An object detection system in accordance with the present embodiment will now be explained with reference to FIG. 1.

Each of ranging sensors 20 may be an ultrasonic sensor having a function of transmitting an ultrasonic wave at a frequency in a range of 20-100 kHz as a probe wave and a function of receiving a reflection of the probe wave from an object. In the present embodiment, four ranging sensors 20 are attached to a front portion of the vehicle 30 (e.g., a front bumper) and spaced apart from each other by a predetermined spacing in a widthwise direction of the vehicle perpendicular to the traveling direction of the vehicle 30. More specifically, the ranging sensors 20 include two center sensors (first and second sensors 21, 22) in proximity to the center line 31 of the vehicle 30 and at symmetrical positions about the center line 31, and corner sensors 23, 24 at front left and right corners of the vehicle 30. Four more ranging sensor 20 are attached to a rear portion of the vehicle 30 (e.g., a rear bumper) at similar positions, therefore including two center sensors and two corner sensors. These rear ranging sensors attached to the rear portion of the vehicle 30 have the same functions as the ranging sensors attached to the front portion of the vehicle 30. Therefore, descriptions for the rear ranging sensors 20 will not be repeated below.

For each of the ranging sensors 20, the ranging sensor has a range of direct object detection 40 such that a reflection of the probe wave transmitted by the ranging sensor from an object within the range of direct object detection can be received by the ranging sensor. Any pair of adjacent ranging sensors 20 are attached to the front portion of the vehicle 30 so that the ranges of direct object detection 40 of the adjacent ranging sensors 20 at least partially overlap each other. Although only the ranges of direct object detection 41, 42 of the first and second ranging sensors (center sensors) 21, 22 are shown in FIG. 1, the corner sensors 23, 24 may also have similar ranges of direct object detection 40. Each of the ranging sensors 20 has a threshold value for amplitude of reflections. Upon receipt of the reflection having an amplitude equal to or greater than the threshold value, the ranging sensor 20 transmits object sensing information including a receipt time of the reflection to an electronic control unit (ECU) 10 as the object detection apparatus of the present embodiment.

The ECU 10 includes a microcomputer formed of CPU and various memories, such as RAM and ROM, and is configured to detect the object(s) 50 around the vehicle 30 based on the object sensing information of the object(s) 50 received from the ranging sensors 20. More specifically, the ECU 10 transmits control signals to at least one of the ranging sensors 20 every predetermined time interval (e.g., every hundreds of milliseconds) to instruct the ranging sensors 20 to transmit the probe wave. Upon receipt of the object sensing information of the object 50 from the ranging sensors 20, the ECU 10 determines the presence or absence of the object 50 around the vehicle based on the received sensing information. When it is determined that the object 50 is present around the vehicle 30, then the ECU 10 performs a vehicle-object interaction avoidance control, such as a steering angle control or a deceleration control, or notification to a driver of the vehicle 30 using an audible alarm so that the vehicle 30 does not interact with or contact the object 50.

The ECU 10 transmits transmission instructions to the ranging sensors 20 to cause each of the ranging sensors 20 to transmit an ultrasonic wave as a probe wave in a predefined sequence at predetermined time intervals. In the present embodiment, in response to the transmission instructions from the ECU 10, the first center sensor 21 transmits an ultrasonic wave and then the second center sensor 22 transmits an ultrasonic wave. Subsequently, the corner sensor 23 transmits an ultrasonic wave and then the corner sensor 24 transmits an ultrasonic wave. The probe waves are sequentially transmitted at predefined time intervals such that the sequentially transmitted probe waves do not interfere with each other. In addition, in the present embodiment, only the first received reflection at the ranging sensors 20 after the sequential transmissions of the ultrasonic waves from the ranging sensors 21, 22, 23, 24 is valid, and the second to fourth reflections received after receipt or the first received reflection are invalidated.

The ECU 10 uses the object sensing information of the object 50 received from the ranging sensors 20 to calculate a position (i.e., coordinates) of the object 50 relative to the vehicle 30 (referred to as a relative position of the object 30) using the principle of triangulation. According to the well-known principle of triangulation, the coordinates of a measurement point are calculated using a known distance between two points and distances from the two points to the measurement point. According to such principle of triangulation, the ECU 10 calculates the relative position of the object 50 based on a known distance between two adjacent ranging sensors 20 whose ranges of direct object detection 40 at least partially overlap each other and measured distances from the two adjacent ranging sensors 20 to the object 50.

Figure 2:
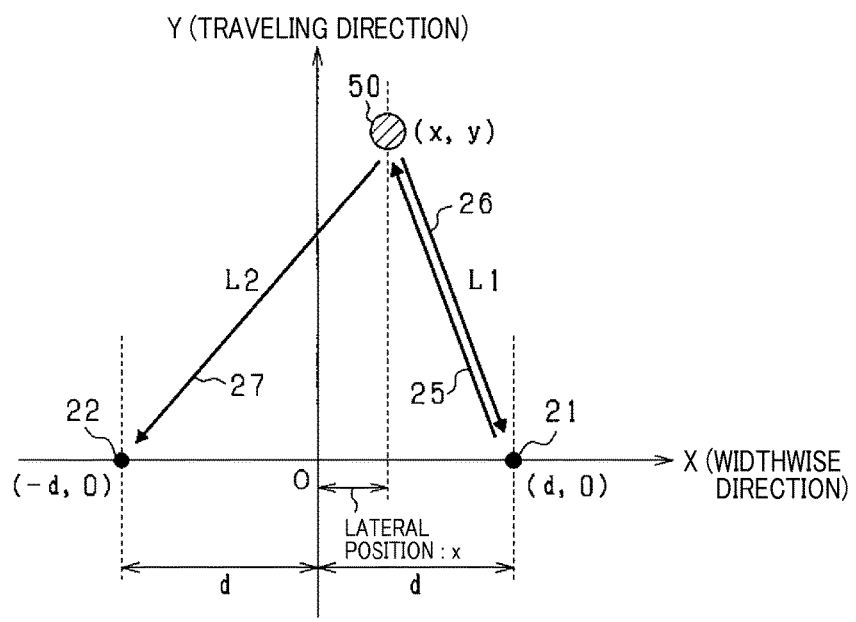
FIG. 2 is a schematic of calculating a position of an object by triangulation.

FIG. 2 is a schematic of calculating the detected relative position of the object 50, which shows the first and second center sensors 21, 22 and the object 50 in front of the first and second center sensors 21, 22 in plan view. In FIG. 2, the first center sensor 21 serves as an active sensor configured to transmit a probe wave 25 and receive a direct wave 26 that is a reflection of the probe wave 25 at a first location, and the second sensor 22 serves as a passive sensor configured to only receive an indirect wave 27 that is a reflection of the probe wave 25 transmitted by the first sensor 21 at a second location away from the first location.

The ECU 10 calculates an estimated (relative) position of the object 50 specified by X- and Y-coordinates x, y of the object 50 in a coordinate system defined by an X-axis being a straight line passing through the first and second sensors 21, 22 and a Y-axis being a straight line passing through a median between the first and second sensors 21, 22 and perpendicular to the X-axis. More specifically, in the present embodiment, the ECU 10 instructs the first center sensor (active sensor) 21 to transmit the probe wave 25. When the first center sensor 21 receives the direct wave 26 that is a reflection of the probe wave 25 from the object 50, the ECU 10 calculates a distance L1 between the first center sensor 21 and the object 50 based on the direct wave 26. When the second center sensor (passive sensor) 22 receives the indirect wave 27 that is a reflection of the probe wave 25 from the object 50, the ECU 10 calculates a distance L2 between the second sensor 22 and the object 50 based on the indirect wave 27.

A distance between an origin O of the coordinate system at which the X-axis and the Y-axis intersect and the first sensor 21 is equal to a distance between the origin O and the second sensor 22, which distances are denoted by d and stored beforehand in the ECU 10. The ECU 10 calculates a first time t1 and a second time t2, where the first time t1 is the time the direct wave 26 is received by the first sensor 21 subtracted by the time the probe wave 25 is transmitted by the first sensor 21 and the second time t2 is the time the indirect wave 27 is received by the second sensor 22 subtracted by the time the probe wave 25 is transmitted by the first sensor 21. The first time t1 multiplied by the speed of sound is twice the distance L1 between the first sensor 21 and the object 50. The second time t2 multiplied by the speed of sound is a sum of the distance L1 between the first sensor 21 and the object 50 and a distance L2 between the second sensor 22 and the object 50. The ECU 10 performs a triangulation calculation using the distance 2$d$ between the first center sensor 21 and the second center sensor 22 and the first time t1 and the second time t2 to calculate the coordinates (x, y) of the object 50.

In the present embodiment, FIG. 2 shows an example where the first center sensor 21 serves as an active sensor and the second center sensor 22 serves as a passive sensor. Practically, coordinates of an object 50 can be calculated using any combination of adjacent sensors 21-24 in a similar manner based on the principle of triangulation. As for the ranging sensors attached to the rear portion of the vehicle 30, coordinates of an object 50 rearward of the vehicle 30 can be calculated using any combination of adjacent sensors attached to the rear portion of the vehicle 30 in a similar manner.

In the present embodiment, the ECU 10 sets, as an indication of the likelihood of the object being actually present, a confidence-level determination counter N for each of the ranging sensors 20 based on the number of times the same object has been detected. For each of the ranging sensors 20, the confidence-level determination counter N is incremented or decremented such that as the number of times the same object has been detected by the ranging sensor increases, the confidence-level determination counter N is increased. When the confidence-level determination counter N exceeds a threshold, it is determined that the object detected by the ranging sensor is actually present around the vehicle 30, so that intervention of the vehicle-object interaction avoidance control is permitted.

Figure 3:
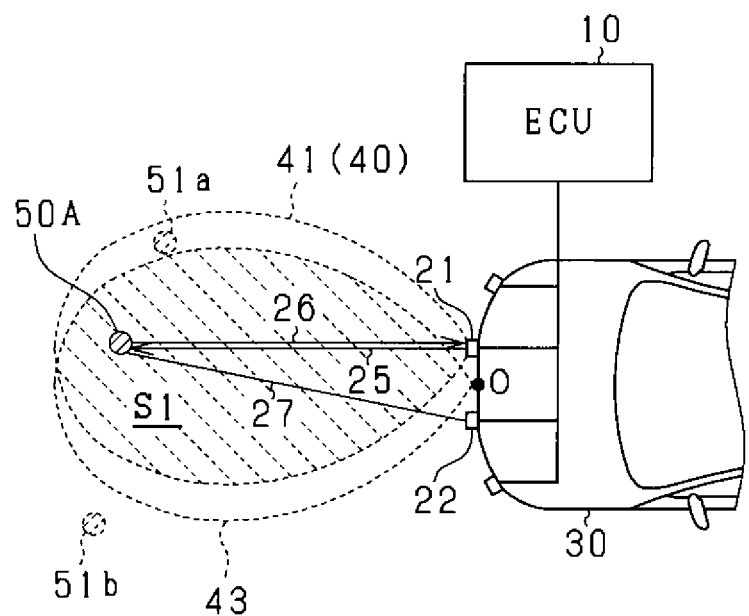
FIG. 3 is a schematic of a positional relationship between a range of direct object detection and a range of indirect object detection.

FIG. 3 shows a positional relationship between a range of direct object detection 41 and a range of indirect object detection 43 where the first center sensor 21 serves as an active sensor and the second center sensor 22 serves as a passive sensor. As above, the range of direct object detection 41 is an area where the first center sensor 21 can detect the object 50 via the direct wave 26. The range of indirect object detection 43 is an area extending from the midpoint (as the origin O) between the first and second center sensors 21, 22 and forward of the vehicle 30 such that a reflection of the probe wave 25 transmitted by the first center sensor 21 adjacent to the sensor 22, from the object 50, i.e., the indirect wave 27, can be received. The range of direct object detection 41 and the range of indirect object detection 43 at least partially overlap. The range of indirect object detection 43 has a substantially same extent as the range of direct object detection 41 or is smaller than the range of direct object detection 41 due to reduced amplitude of the indirect wave 27.

When coordinates (x, y) of the object 50 are calculated using the first time t1 and the second time t2 according to the principle of triangulation, the detected position of the object specified by the calculated coordinates (x, y) must be within an area where the object can be detected not only by the direct wave 26, but also by the indirect wave 27. That is, the overlapping range S1 of the range of direct object detection 41 and the range of indirect object detection 43 can provide an area where the triangulation calculation is feasible (hereinafter referred to as a triangulation-feasible area). Correct calculated coordinates of the object 50 should fall within the overlapping range S1. If the detected position of the object 50 is out of the overlapping range S1, it is likely that the object 50 is not actually present at the detected position, that is, the object 50 is present at an erroneous position.

Reflections of the probe wave may change due to various factors, such as a shape of the object, the number of objects around the vehicle, a surrounding environment and the like, so that the detected position of the object may be out of the triangulation-feasible area despite the object being actually within the triangulation-feasible area. Thus, a position at which the object is not actually present may be detected. More specifically, examples of circumstances where a position at which no object is actually present may be incorrectly detected include events where the probe wave transmitted by the active sensor 20 is reflected multiple times from concavo-convex objects or where the first received reflections received by a pair of adjacent sensors are reflections from different objects and then an object position is calculated according to the principle of triangulation based on such first received reflections.

Thus, in the present embodiment, a positional relationship between the triangulation-feasible area that is an overlapping range S1 of the range of direct object detection 41 and the range of indirect object detection 43 and the detected position of the object 50 is determined, and based on the positional relationship, it is determined whether or not the detected position of the object 50 is invalid.

More specifically, based on the direct wave 26 and the indirect wave 27, it is determined whether or not the detected position of the object 50 is out of the triangulation-feasible area. If it is determined that the detected position of the object 50 is within the triangulation-feasible area, the calculation result is determined to be valid. If it is determined that the detected position of the object 50 is out of the triangulation-feasible area, the calculation result is determined to be invalid. For example, in FIG. 3, in the case of the detected position 50A, the calculation result is valid since the position 50A is within the triangulation-feasible area. In the case of the detected position 51b or 51a, the calculation result is invalid since the position 51b and the position 51a are out of the triangulation-feasible area.

Figure 4A:
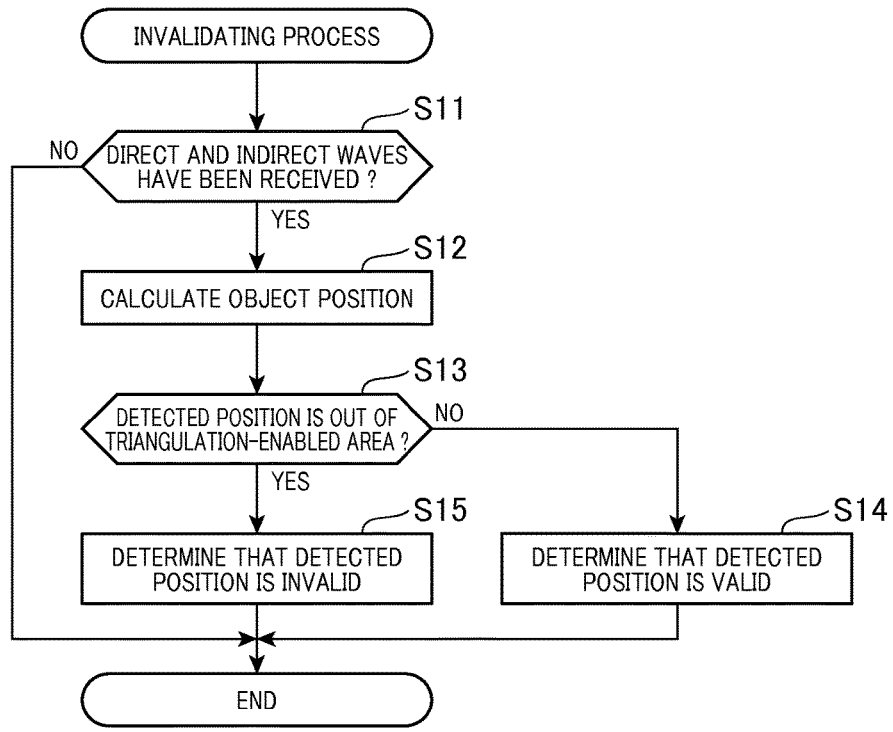
FIG. 4A is a flowchart of an invalidating process in accordance with the first embodiment.

FIG. 4A shows a flowchart of a process of invalidating the calculated object position in accordance with the present embodiment. This process is performed in the ECU 10 repeatedly every predetermined time interval.

Referring to FIG. 4A, in step S11, it is determined whether or not the direct wave 26 and the indirect wave 27 have been received during a predetermined wait period after transmission of the probe wave 25 from the ranging sensor 21. The predetermined wait period may be set to, for example, tens of milliseconds. If in step S11 it is determined that the direct wave 26 and the indirect wave 27 have been received during the predetermined wait period, then the process proceeds to step S12, where based on the direct and indirect waves 26, 27, an object position specified by coordinates (x, y) is calculated according to the principle of triangulation as described with reference to FIG. 2.

Subsequently, in step S13, it is determined whether or not the detected position of the object 50 calculated as above is out of the triangulation-feasible area.

Figure 4B:
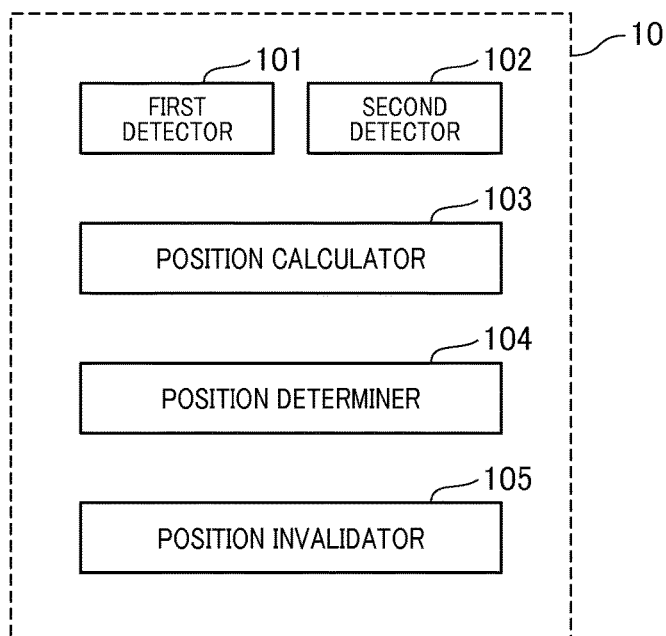
FIG. 4B is a functional block diagram of an electronic control unit of the object detection system in accordance with the first embodiment.

If in step S13 it is determined that the detected position of the object 50 is within the triangulation-feasible area, then the process proceeds to step S14, where the calculation result in the current cycle is determined to be valid. If in step S13 it is determined that the detected position of the object 50 is our of the triangulation-feasible area, then the process proceeds to step S15, where the calculation result in the current cycle is determined to be invalid. Thereafter, the process ends. This process has been explained for the pairwise combination of adjacent sensors 21, 22, as an example. Practically, the above process is performed for each combination of adjacent sensors (active and passive sensors) among the ranging sensors 21-24 such that the range of direct object detection for one of the adjacent sensors and the range of indirect detection for the other of the adjacent sensors at least partially overlap. For each combination of adjacent sensors among the ranging sensors 21-24, the range of direct detection and the range of indirect detection are predefined and stored beforehand in a memory, such as ROM of the ECU 10. The range of direct detection and the range of indirect detection for each combination of adjacent sensors are read from the memory, and the overlapping range S1 of the range of direct detection and the range of indirect detection is set as the triangulation-feasible area. In the present embodiment, the size and position of the triangulation-feasible area is predetermined for each combination of adjacent sensors. FIG. 4B shows a functional block diagram of the ECU 10 that corresponds to the object detection apparatus of the present embodiment, The ECU 10 includes first and second detectors 101, 102 responsible for execution of step S11, a position calculator 103 responsible for execution of step S12, a position determiner 104 responsible for execution of step S13, and an position invalidator 105 responsible for execution of step S15. Functions of these functional blocks may be implemented by the CPU executing various programs stored in the ROM or the like.

The object detection apparatus of the present embodiment configured as above can provide the following advantages.

Based on the positional relationship between the object position calculated based on the object sensing information according to the principle of triangulation and the overlapping area (that is the triangulation-feasible area) of the range of direct object detection 40 and the range of indirect object detection 43. More specifically, it is determined whether or not the detected position of the object 50 is out of the triangulation-feasible area. If it is determined that the detected position of the object 50 is within the triangulation-feasible area, then the calculation result is determined to be valid. If it is determined that the detected position of the object 50 is out of the triangulation-feasible area, then the calculation result is determined to be invalid, that is, the calculation result is invalidated. With such a configuration, the calculation result which provides the detected position of the object whose validity is suspicious is discarded, which can prevent various types of control for improving vehicle driving safety from being unnecessarily performed.

Second Embodiment

An object detection apparatus mounted in a moving object in accordance with a second embodiment will now be explained with reference to the accompanying drawings. In the first embodiment, for each combination of adjacent sensors among the ranging sensors 21-24, the triangulation-feasible area that is an overlapping area of the range of direct detection and the range of indirect detection are predefined and remains unchanged. In the second embodiment, the triangulation-feasible area for each combination of adjacent sensors among the ranging sensors 21-24 is variably set as a function of parameters of an ambient environment around the vehicle carrying the apparatus. In the following, only differences of the second embodiment from the first embodiment will be described.

Reflections of the ultrasonic wave transmitted by one of the ranging sensors (as an active sensor) 20 may vary depending upon parameters of the ambient environment around the vehicle 30, such as an outside air temperature, a humidity, and a wind strength and others. More specifically, the higher outside air temperature, the higher humidity, or the higher wind strength will weaken the reflections. Thus, the weakened reflections of the ultrasonic wave weaken will cause the range of direct object detection and the range of indirect object detection of the ranging sensor 20 to shrink in both traveling and widthwise directions of the vehicle. Accordingly, the triangulation-feasible area will be narrowed. Addressing this concern, in the present embodiment, the triangulation-feasible area is variably set as a function of parameters of the ambient environment around the vehicle 30.

Figure 5A:
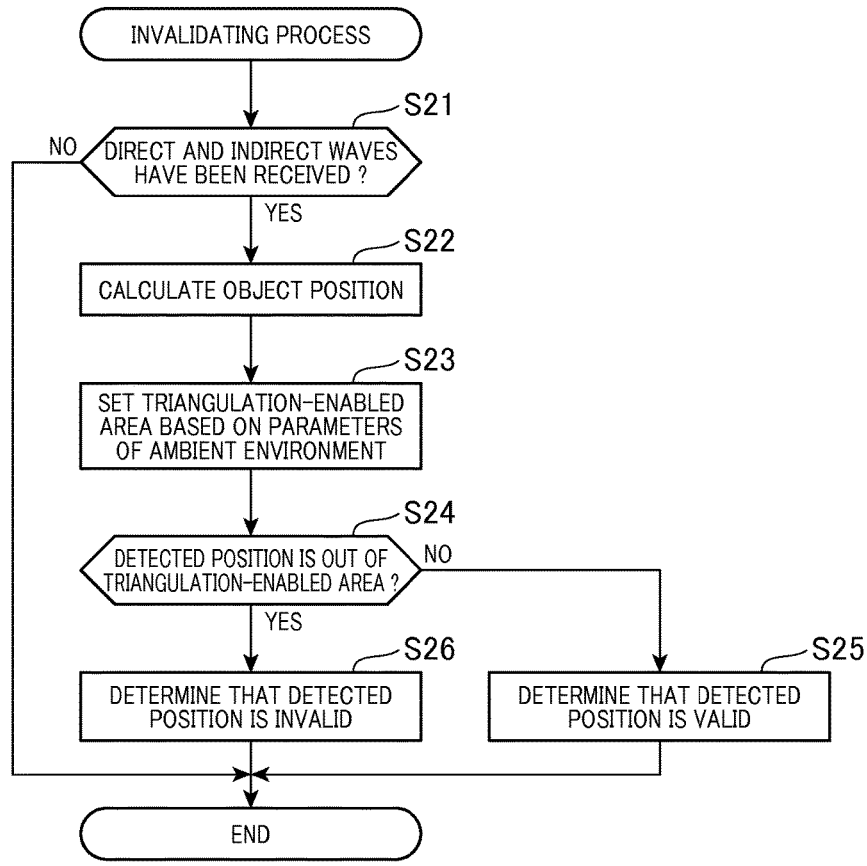
FIG. 5A is a flowchart of an invalidating process in accordance with a second embodiment.

FIG. 5A shows a flowchart of a process of invalidating the detected position of the object in accordance with the present embodiment. This process is performed in the ECU 10 repeatedly every predetermined time interval. Similar steps of the flowchart of FIG. 5A to those of the flowchart of FIG. 4A are assigned like reference numerals and will not be explained repeatedly.

In FIG. 5A, in steps S21, S22, the same operations are performed as the operations in steps S11, S12 in FIG. 4A. Subsequently, in step S23, the triangulation-feasible area is variably set based on the parameters of the ambient environment. In the present embodiment, the parameters of the ambient environment include, but are not limited to, the outside air temperature, the outside air humidity, and the wind speed. Detection signals are received from various sensors for detecting the parameters of the ambient environment. The triangulation-feasible area is set depending upon received values of the parameters of the ambient environment. A narrower triangulation-feasible area is set at a higher outside air temperature, a higher outside air humidity, or a higher wind speed.

Figure 5B:
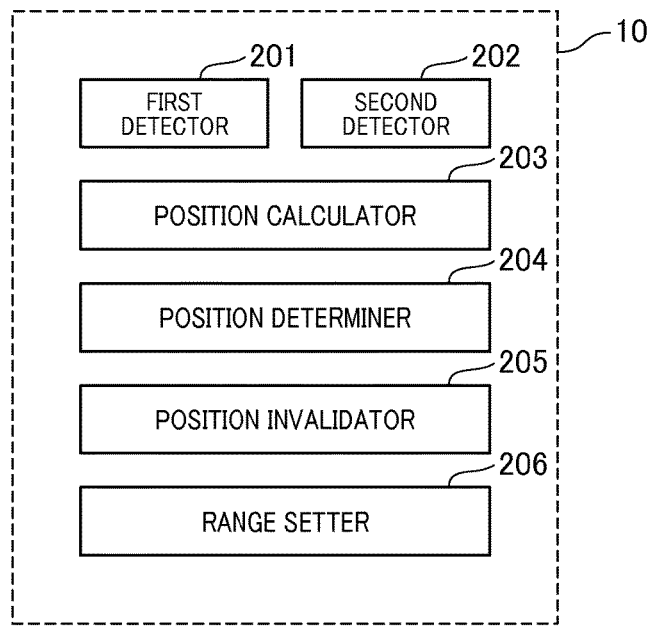
FIG. 5B is a functional block diagram of an electronic control unit of the object detection system in accordance with the second embodiment.

Subsequently, in step S24, based on a positional relationship between the triangulation-feasible area and the detected position of the object 50, it is determined whether or not the detected position of the object 50 is out of the triangulation-feasible area. If in step S24 it is determined that the detected position of the object 50 is within the triangulation-feasible area, then the process proceeds to step S25, where the calculation result is determined to be valid. If in step S24 it is determined that the detected position of the object 50 is out of the triangulation-feasible area, then the process proceeds to step S26, where the calculation result is determined to be invalid or the calculation result is invalidated. As in the first embodiment, the above process is performed for each combination of adjacent sensors (active and passive sensors) among the ranging sensors 21-24. FIG. 5B shows a functional block diagram of the ECU 10 that corresponds to the object detection apparatus of the present embodiment. The ECU 10 includes first and second detectors 201, 202 responsible for execution of step S21, a position calculator 203 responsible for execution of step S22, a position determiner 204 responsible for execution of step S24, an position invalidator 205 responsible for execution of step S26, and a range setter 206 responsible for execution of step S23. The first and second detectors 201, 202, the position calculator 203, the position determiner 204, the position invalidator 205 have similar functions to those of the first and second detectors 101, 102, the position calculator 103, the position determiner 104, and the position invalidator 105, respectively. Functions of these functional blocks may be implemented by the CPU executing various programs stored in the ROM or the like.

In the second embodiment described as above, the triangulation-feasible area is variably set as a function of parameters of the ambient environment around the vehicle 30, and based on a positional relationship between the variably set triangulation-feasible area and the position of the object calculated according to the principle of triangulation, it is determined whether the calculation result is valid or invalid. The reflections of the ultrasonic wave transmitted by one of the ranging sensors (as an active sensor) 20 may vary depending upon parameters of the ambient environment around the vehicle 30, such as an outside air temperature, a humidity, and a wind strength and others, which may cause the triangulation-feasible area to vary. With the present embodiment configured as above addressing this concern, the calculation result of the object position can be more accurately verified. This can prevent the vehicle-object interaction avoidance control from being actuated in situations where actuation would be undesired or from being left unactuated in situations where actuation would be desired.

Third Embodiment

An object detection apparatus mounted in a moving object in accordance with a third embodiment will now be explained with reference to the accompanying drawings. In the first embodiment, for each combination of adjacent sensors among the ranging sensors 21-24, it is determined whether the object position calculated based on the first received reflections (i.e., the first received direct and indirect waves) is valid or invalid. In the third embodiment, if it is determined that the object position calculated based on the first received reflections is out of the triangulation-feasible area, then the object position is calculated based on the first received reflection and the subsequently received reflections according to the principle of triangulation. Based on a positional relationship between the triangulation-feasible area and the calculated object position, it is determined whether or not the calculation result is valid or invalid.

Figure 6A:
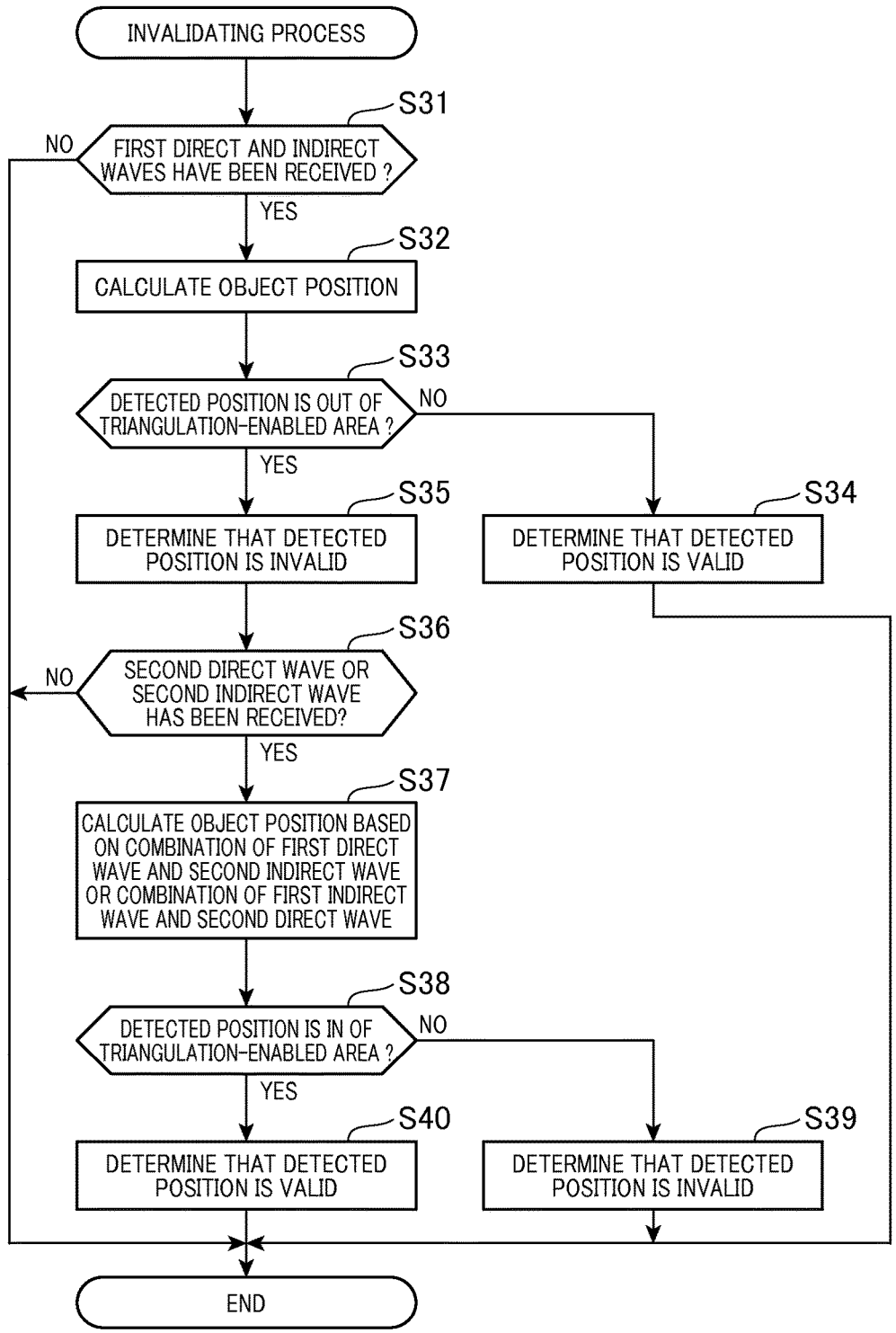
FIG. 6A is a flowchart of an invalidating process in accordance with a third embodiment.

FIG. 6A shows a flowchart of a process of invalidating the detected position of the object in accordance with the present embodiment. This process is performed in the ECU 10 repeatedly every predetermined time interval. Similar steps of the flowchart of FIG. 6A to those of the flowchart of FIG. 4A are assigned like reference numerals and will not be explained repeatedly.

Referring to FIG. 6A, in step S31, after transmission of the probe wave from the ranging sensor 21(20), it is determined whether or not the first direct wave and the first indirect wave of the probe wave have been received. If in step S31 it is determined that the first direct wave and the first indirect wave of the probe wave have been received, then the process proceeds to step S32. In subsequent steps S32-S35, the same operations are performed as the operations in steps S12-S15 shown in FIG. 4A. In step S34, the object position calculated in the current cycle is determined to be valid, then the process ends. If in step S35 the object position calculated in the current cycle is determined to be invalid, then the process proceeds to step S36.

In step S36, it is determined whether or not the second direct wave or the second indirect wave has been received. If the first direct wave and the first indirect wave are reflections from different objects, the second or subsequent direct wave and the first indirect wave may be reflections from the same object, or the first direct wave and the second or subsequent indirect wave may be reflections from the same object. The reflections from the same object may allow the object position to be calculated according to the principle of triangulation. That is, the reflections from the same object may allow coordinates of the object to be calculated in a manner as described with reference to FIG. 2. In such a case, the object position calculated based on a combination of the first direct wave and the second indirect wave or a combination of the second direct wave and the first indirect wave is determined to be valid.

If in step S36 it is determined the second direct wave or the second indirect wave has been received, then the process proceeds to step S37, where the object position is calculated based on a combination of the first direct wave and the second indirect wave or a combination of the second direct wave and the first direct wave in a manner as described with reference to FIG. 2. Subsequently, in step S38, it is determined whether or not the calculated object position is within the triangulation-feasible area. If in step S38 it is determined that the calculated object position is out of the triangulation-feasible area, then the process proceeds to step S39, where the calculation result is determined to be invalid. If in step S38 it is determined that the calculated object position is within the triangulation-feasible area, then the process proceeds to step S40, where the calculation result is determined to be valid. In step S36, it is determined whether or not the second direct wave or the second indirect wave has been received. Alternatively, in step S38, it may be determined whether or not the second or subsequent (e.g., third or fourth) direct wave or the second subsequent indirect wave has been received. As in the first embodiment, the above process is performed for each combination of adjacent sensors (active and passive sensors) among the ranging sensors 21-24. FIG. 6B shows a functional block diagram of the ECU 10 that corresponds to the object detection apparatus of the present embodiment. The ECU 10 includes first and second detectors 301, 302 responsible for execution of step S31, a position calculator 303 responsible for execution of steps S32, S37, a position determiner 304 responsible for execution of steps S33, S38, a position invalidator 305 responsible for execution of step 35, a receipt determiner 306 responsible for execution of step S36, and a position validator (307) responsible for execution of step S40. Functions of these functional blocks may be implemented by the CPU executing various programs stored in the ROM or the like.

In the third embodiment, if it is determined that the object position calculated based on the first received direct and indirect waves is out of the triangulation-feasible area and thus the calculation result is determined to be invalid, then the object position is calculated based on the first received reflection and the second or subsequent received reflection according to the principle of triangulation. If the calculated object position is within the triangulation-feasible area, then the calculation result is determined to be valid. With such a configuration, as much accurate information as possible about the object around the vehicle 30 can be acquired.

Other Embodiments

There will now be explained some other embodiments that may be devised without departing from the spirit and scope of the present invention.

(i) In the first to third embodiments, it is determined whether or not the object position calculated based on the direct and indirect waves is out of the triangulation-feasible area. If it is determined that the calculated object position is out of the triangulation-feasible area, the calculation result is determined to be invalid or the calculation result is invalidated. Alternatively, it may be determined whether or not the calculated object position is out of an invalidating area that is large enough to include the whole triangulation-feasible area. If it is determined that the calculated object position is out of such an invalidating area, then it may be determined that the calculation result is invalid.

(ii) In the second embodiment, the triangulation-feasible area is variably set using the values of the outside air temperature, the outside air humidity, and the wind speed as parameters of the ambient environment. Alternatively, the triangulation-feasible area may be variably set using the value(s) of only one or two of the outside air temperature, the outside air humidity, and the wind speed as parameters of the ambient environment.

(iii) In the first to third embodiments, the ranging sensors 20 are attached to the front and rear portions of the vehicle 30 to detect an object around the vehicle 30. Alternatively or additionally, the ranging sensors 20 may be attached to the right- and left-side surface portions of the vehicle 30 to detect an object around the vehicle 30.

(iv) In the first to third embodiments, the ranging sensors 20 are ultrasonic sensors adapted to use an ultrasonic wave as a probe wave to detect an object. Alternatively, the ranging sensors 20 may be any other sensors capable of transmitting a probe wave and receive a reflection of the probe wave to thereby detect an object. The ranging sensors 20 may include millimeter-wave radar or laser radar or the like adapted to use an electromagnetic wave to detect an object.

(v) In the first to third embodiments, the object detection apparatus is mounted in the vehicle. Alternatively, the object detection apparatus may be mounted in a moving object other than the vehicle, such as an airplane, a ship, a robot or the like. Still alternatively, the object detection apparatus may be mounted in a fixed object and is used to measure a distance between the fixed object and an object around the fixed object. This is advantageous because even when the apparatus is mounted in the fixed object, multiple reflections between the fixed object and objects around the fixed object may occur. Yet still alternatively, the object detection apparatus may be carried on and by a person to warn the person about an object approaching the person.

What is claimed is:

1. An object detection apparatus for detecting an object around a moving object having a plurality of ranging sensors attached to the moving object by transmitting a probe wave and receiving reflections of the probe wave from the object via the plurality of ranging sensors, the apparatus comprising:
   a first detector configured to detect the object based on a direct wave that is a reflection of the probe wave from the object, the probe wave and the reflection being respectively transmitted and received by a first ranging sensor that is one of the plurality of ranging sensors;
   a second detector configured to detect the object based on an indirect wave that is a reflection of the probe wave from the object, the reflection being received by a second ranging sensor that is another one of the plurality of ranging sensors;
   a position calculator configured to calculate an object position as a position of the object based on the detections of the first and second detectors according to the principle of triangulation;
   a position determiner configured to determine whether or not the object position calculated by the position calculator is out of an overlapping range of a range of direct object detection and a range of indirect object detection, the range of direct object detection being an area where the first ranging sensor can detect the object using the direct wave, the range of indirect object detection being an area where the second ranging sensor can detect the object via the indirect wave; and
   a position invalidator configured to, based on the determination made by the position determiner, determine that the object position calculated by the position calculator is invalid.

2. The apparatus of claim 1, wherein the position invalidator is configured to, if it is determined by the position determiner that the object position calculated by the position calculator is out of the overlapping range of the ranges of direct and indirect object detection, determine that the object position calculated by the position calculator is invalid.

3. The apparatus of claim 1, further comprising a range setter configured to variably set the overlapping range of the ranges of direct and indirect object detection based on parameters of an ambient environment around the moving object,
   wherein the position determiner is configured to determine whether or not the object position calculated by the position calculator is out of the overlapping range that is variably set by the range setter based on the parameters of the ambient environment around the moving object, and the position invalidator is configured to, based on the determination made by the position determiner, determine that the object position calculated by the position calculator is invalid.

4. The apparatus of claim 2, further comprising: a receipt determiner configured to determine whether or not at least one of the first and second ranging sensors has received the reflections of the probe wave multiple times after transmission of the probe wave from the first ranging sensor,
   wherein if it is determined by the position determiner that the object position calculated by the position calculator using the first received direct wave and the first received indirect wave is out of the overlapping range of the ranges of direct and indirect object detection and then it is determined by the position invalidator that the object position calculated by the position calculator using the first received direct wave and the first received indirect wave is invalid, and then if it is determined by the receipt determiner that at least one of the first and second ranging sensors has received the reflections of the probe wave multiple times after transmission of the probe wave from the first ranging sensor, the position calculator calculates the object position based on a combination of the first direct wave received by the first ranging sensor and the second or subsequent indirect wave received by the second ranging sensor or a combination of the first indirect wave received by the second ranging sensor and the second or subsequent direct wave received by the first ranging sensor, the apparatus further comprises a position validator configured to, if it is determined by the position determiner that the object position calculated by the position calculator based on the combination of the first direct wave received by the first ranging sensor and the second or subsequent indirect wave received by the second ranging sensor or the combination of the first indirect wave received by the second ranging sensor and the second or subsequent direct wave received by the first ranging sensor is within the overlapping range of the ranges of direct and indirect object detection, determine that the object position calculated by the position calculator is valid.

5. The apparatus of claim 1, wherein each of the plurality of ranging sensors is an ultrasonic sensor capable of transmitting an ultrasonic wave as the probe wave.

6. The apparatus of claim 1, wherein the first and second ranging sensors are a pair of adjacent ranging sensors.

7. The apparatus of claim 1, wherein the apparatus is mounted in the moving object.

8. The apparatus of claim 1, wherein the moving object is a vehicle, and the apparatus is mounted in the vehicle.

* * * * *